No. 745,852.  Patented December 1, 1903.

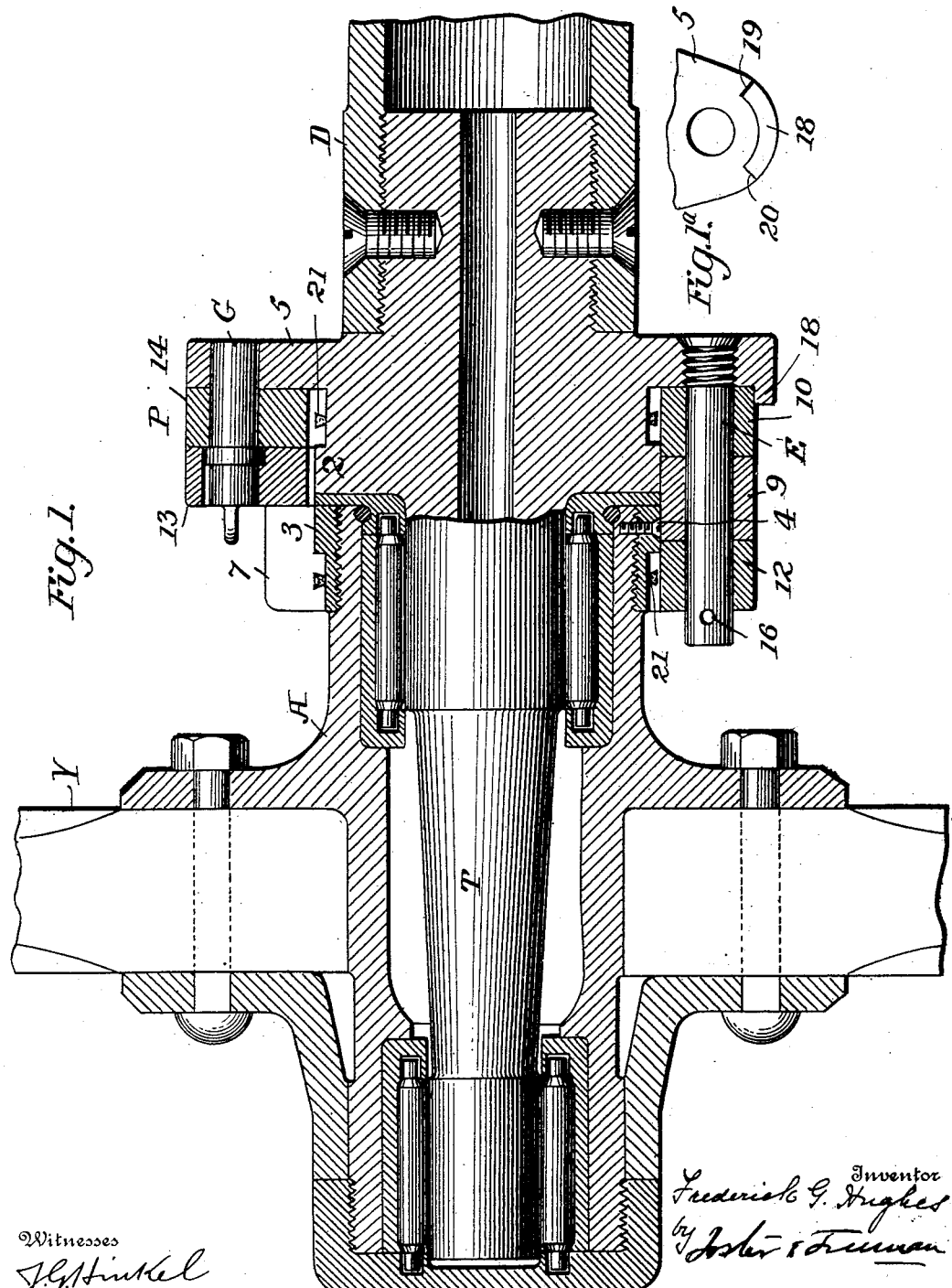

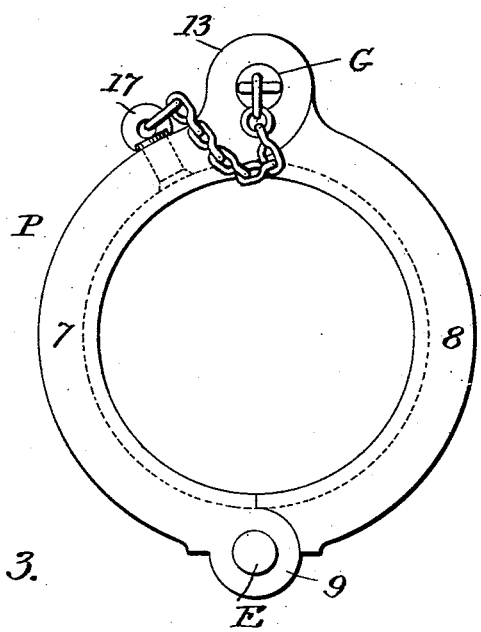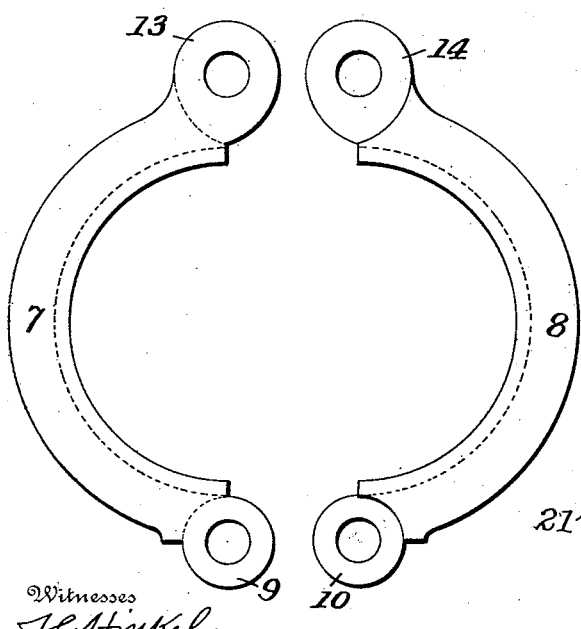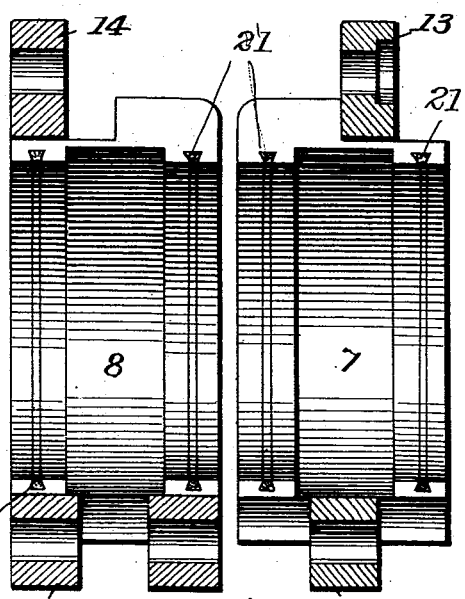

UNITED STATES PATENT OFFICE.

FREDERICK G. HUGHES, OF BETHLEHEM, PENNSYLVANIA, ASSIGNOR TO BETHLEHEM STEEL COMPANY, OF SOUTH BETHLEHEM, PENNSYLVANIA, A CORPORATION OF PENNSYLVANIA.

COUPLING FOR WHEELS AND AXLES.

SPECIFICATION forming part of Letters Patent No. 745,852, dated December 1, 1903.

Application filed December 22, 1902. Serial No. 136,302. (No model.)

*To all whom it may concern:*

Be it known that I, FREDERICK G. HUGHES, a citizen of the United States, residing at Bethlehem, in the county of Northampton and State of Pennsylvania, have invented certain new and useful Improvements in Couplings for Wheels and Axles, of which the following is a specification.

My invention relates to means for coupling a wheel to an axle; and it consists in providing the hub and axle with adjacent annular flanges inclosed by a coupling or clamp and in certain details of construction fully set forth hereinafter and illustrated in the accompanying drawings, in which—

Figure 1 is a longitudinal section of one end of an axle and the hub of a wheel embodying my improvements. Fig. 1ᵃ is a detail. Fig. 2 is a face view of the sectional coupling or clamp; Fig. 3, a view showing the sections detached; Fig. 4, an edge view of the sections in section through the ears.

The axle D, preferably of metal, terminates in a journal T, at the rear end of which the axle is thickened and provided with an annular flange 2, corresponding to a similar flange 3 at the inner end of the hub A of the wheel or pulley Y, which may be of any desired character. As shown, the flange 3 is part of a hardened metal ring threaded and screwed onto the hub and secured by screws 4. On the axle at the rear of the flange 2 is a deeper flange 5.

To hold the hub to the axle, yet permit the hub to turn freely, I clamp the two together by a clamp P, having an internal groove receiving the two flanges 2 3. This clamp may be constructed in different ways, but, as shown, is in two semi-annular sections 7 8, the section 7 having at the lower end a perforated ear 9, which extends between ears 10 12 at the lower end of the section 8, while at the upper ends of the sections are overlapping perforated ears 13 14. The two sections are connected by pins E G, passing through the perforations of the ears, and preferably one of the pins is secured to the axle, so that the sections can be separated to permit the detachment of the hub without detaching the coupling from the axle. As shown, the lower pin E is screwed into the flange 5 of the axle and has a cross-socket 16 for a linchpin, on removing which the clamp may be slipped longitudinally from the pin. The upper pin G may be secured detachably in place in any suitable manner, and preferably is connected to an ear 17 by a chain to prevent loss.

The axle may have a projection 18 on the flange 5 of such length as to present shoulders 19 20, so situated as to limit the outward swing of the clamp-sections just sufficient to permit the ready detachment of the hub.

The inner faces of the sections 7 8 have grooves to receive felt dust-rings or packings 21, which bear on cylindrical parts of the axle and hub and exclude dust.

Among the advantages obtained by the use of this coupling are: First. The extreme rapidity with which the wheel can be removed from the axle and replaced. Second. Notwithstanding the ease of detachment of the wheel obtained by use of this coupling there is an absolutely secure fastening between the hub and the axle. Third. There is secured a dust-proof joint between the hub and the axle, always an advantage where wearing parts come in contact. Fourth. This coupling is adaptable to any kind of wheel, whether roll, ball, or plain bearing, providing simply that a flange-collar be provided at the inside end of hub and a similar flange on the axle.

Without limiting myself to the precise construction shown, I claim—

1. The combination of an axle having a flange, a wheel having a like flange formed on a ring detachably secured to the hub, and a sectional clamp having an annular groove receiving both flanges and holding them in contact while permitting the rotation of the wheel, substantially as described.

2. The combination of an axle and a wheel having an annular flange on the hub adjacent to a like flange on the axle, and a sectional clamp having an annular groove receiving both said flanges and holding them in contact while permitting the rotation of the hub, the flange of the hub on an annular hardened ring secured to the hub, substantially as set forth.

3. The combination of an axle and a wheel having an annular flange on the hub adjacent to a like flange on the axle, a sectional clamp having an annular groove receiving both said flanges and holding them in contact while permitting the rotation of the hub, said clamp in sections pivoted by a pin parallel with the axle, and shoulders on the axle limiting the outward swing of the clamp-sections, substantially as set forth.

In testimony whereof I have signed my name to this specification in the presence of two subscribing witnesses.

FREDERICK G. HUGHES.

Witnesses:
 JOHN ROSEWARNE, Jr.,
 PAUL E. KUSSLY.